Feb. 24, 1953 H. E. GOLDSTINE 2,629,775

SIGNAL CONVERTER

Filed June 17, 1950 2 SHEETS—SHEET 1

INVENTOR
Hallan E. Goldstine
BY Harry Tunick
ATTORNEY

SIGNAL CONVERTER

Filed June 17, 1950 2 SHEETS—SHEET 2

INVENTOR
Hallan E. Goldstine
BY Harry Tunick
ATTORNEY

Patented Feb. 24, 1953 2,629,775

UNITED STATES PATENT OFFICE 2,629,775

SIGNAL CONVERTER

Hallan E. Goldstine, Port Jefferson Station, N. Y., assignor to Radio Corporation of America, a corporation of Delaware Application June 17, 1950, Serial No. 168,771

8 Claims. (Cl. 178—66)

This invention relates to a tone signal converter (TSC). More particularly, it relates to a circuit for converting a varying-frequency tone input to a direct current output. Such a converter finds use in the transmission of radiophoto and facsimile by the carrier frequency shift method.

An object of this invention is to devise a circuit which provides a direct current output varying linearly with the tone frequency input.

Another object is to provide an arrangement which operates to give a predetermined output when the input signal falls below a predetermined level.

The foregoing and other objects of this invention will be best understood from the following description of an example thereof, reference being had to the accompanying drawings, wherein.

The objects of this invention are accomplished, briefly, in the following manner: The incoming tone frequency signal is amplified and clipped. The square wave output of the clippers is applied to a delay line to produce pulses of constant duration. The pulses are rectified to produce direct current varying with frequency. The square waves are rectified, this latter rectified output being connected as a bucking voltage to provide zero net D. C. output at a certain input frequency. If the input signal level drops below a predetermined value, a relay switches in a local oscillator to provide a predetermined tone input frequency to the converter.

Figure 1:
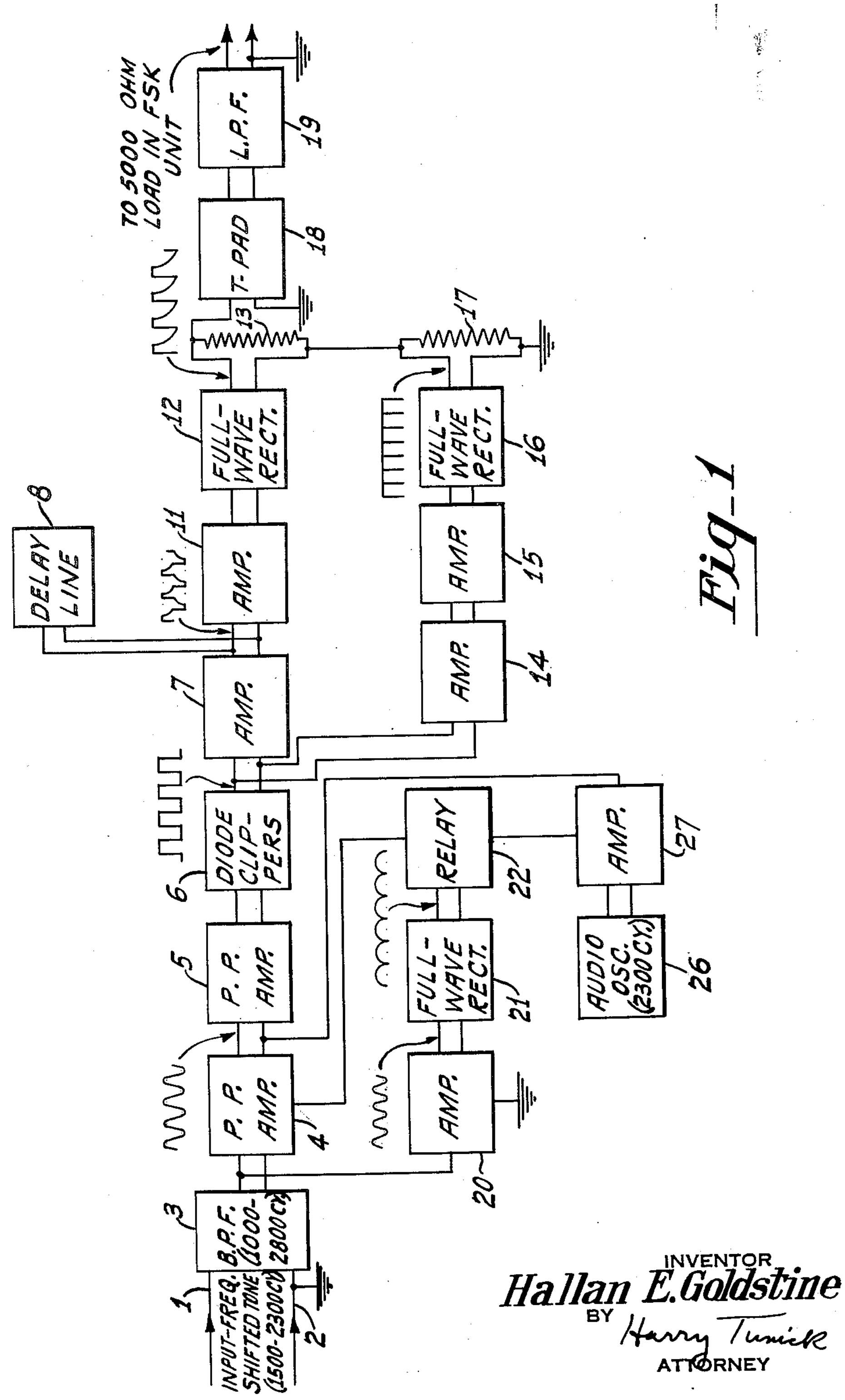
Fig. 1 is a block diagram of a converter according to this invention.

Now referring to Fig. 1, the incoming frequency is supplied from the central office by lines 1 and 2. The radiophoto or facsimile signal is sent out from the central office as a frequency shifted audio tone. The tone is shifted in accordance with picture intelligence from 2,300 cycles (black level) to 1,500 cycles (white level). The converter of this invention provides a D. C. output signal which varies in amplitude linearly with the input tone frequency, between 1,500 and 2,300 cycles. The converter provides zero D. C. output at 1,500 cycles input and maximum negative D. C. output at 2,300 cycles input. The D. C. converter output is applied to the input of a suitable frequency shift keying (FSK) unit. This will produce radio frequency carrier shifts of the transmitter output. The total carrier shift may be adjusted to be 800 cycles from black to white, the black level being the higher radio frequency. The carrier shift is thus made to be essentially linear with respect to the incoming tone frequency between the white and black levels.

Figure 2:
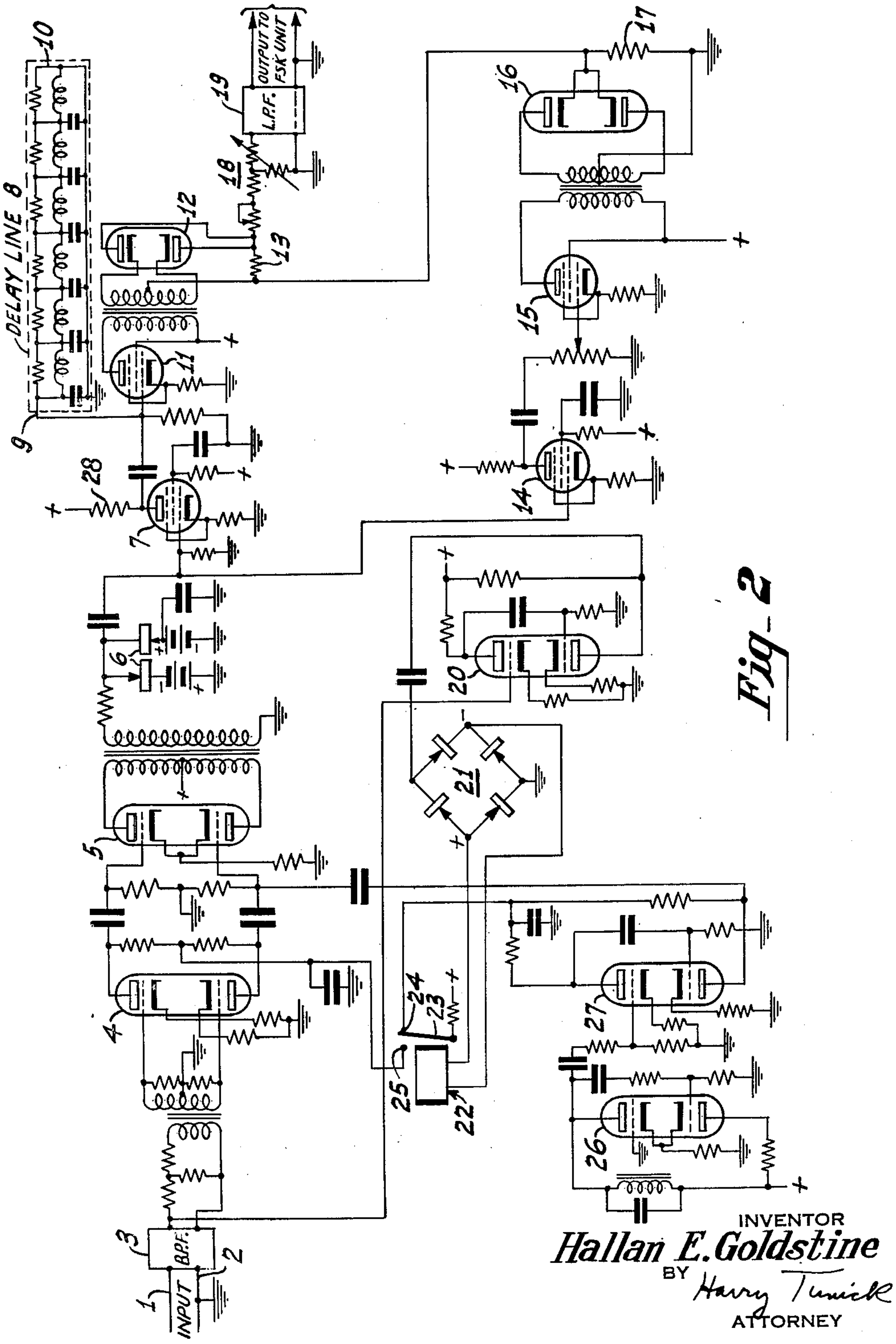
Fig. 2 is a rather detailed circuit diagram of the system of this invention.

The signal on lines 1 and 2 is fed to bandpass filter 3 which may pass frequencies between 1,000 and 2,800 cycles. Filter 3 restricts the bandwidth of the system, thereby reducing hum and noise components and also eliminating harmonics of the tone frequency. The signal is then fed through two cascaded push-pull amplifier stages 4 and 5. For any particular frequency of input, the incoming tone may be of substantially sinusoidal shape, as indicated at the output of stage 4. From stage 5, the signal is fed to diode clippers 6, where the wave is squared up and limited. As shown in Fig. 2, the clippers comprise two parallel oppositely-poled biased diodes. Therefore, both positive and negative half-cycles of the sine wave are limited or clipped. The output of amplifier 5 is of very high voltage level as compared to the level at which clipping occurs in clippers 6, so that the output of the clippers is essentially a square wave, as indicated in Fig. 1.

The square wave is amplified in amplifier 7. It is then applied to a delay line 8. This line functions in effect to produce pulses of constant duration from the square wave. As shown in Fig. 2, this delay line preferably consists of a plurality of transmission line sections arranged in cascade. One end 9 of this line is coupled to the output of amplifier 7 and the opposite end 10 thereof is short-circuited. End 9 is also coupled to the input of amplifier 11.

The surge impedance of line 8 has a value determined by the values of the inductances and capacitances in such line. The design of the circuit is such that this impedance is approximately equal to that of the plate load resistor 28 of amplifier tube 7. Tube 7 is a pentode having a high plate resistance and may be considered a constant current source. Thus, the voltage applied to the grid of tube 11 is a function of the output impedance for tube 7.

When a square pulse of current from tube 7 first starts down line 8, the voltage applied to the grid of tube 11 is equal to that portion of the total plate current that goes into line 8 multiplied by the surge impedance of the line. This portion is approximately half the total current, since the remaining portion flows in resistor 28. Now after a certain period of time, the voltage wave is reflected from the short-circuited end 10 of the delay line, and after an equal period of time it is returned to the input 9 of the line 8 approximately equal in amplitude but 180° out of phase. The delay line has an electrical length such as to provide this 180° phase relationship. The resistor 28 absorbs this reflected energy. The voltage (current) wave travels down the line and is reversed in phase, so that at the moment of arrival of the reflected wave the impedance of line 8 looks like a very high impedance (very low admittance) and all of the output current of tube 7 then flows through 28. The input to the line 8 at this instant is approximately zero and the output voltage applied to the grid of tube 11 is zero because the output impedance for tube 7 is zero at this time.

Thus, the effective impedance across the output of tube 7 varies during transmission of the pulse and the effective input impedance of the delay line 8 looks alternately like a short circuit and an open circuit. Therefore, in effect the input to the delay line is, for the circuit of this invention, the algebraic sum of a square main voltage wave and the reflected square wave 180° out of phase therewith. The input to line 8 (also the input to amplifier 11), assuming perfect reflection from end 10 of line 8, will consist of a succession of positive and negative square pulses, one for each corresponding half-period of the applied square wave, with intervals of zero voltage between successive square pulses. Since reflection is in the actual case not perfect, these pulses are illustrated in Fig. 1 as having sloping trailing edges, rather than square trailing edges. These pulses are depicted in Fig. 1 adjacent the input to amplifier 11.

Thus, the time delay of the signal traveling down line 8 and back from the end 10 thereof, determines the effective duration of the pulses produced at the input of 11. This time delay is constant, regardless of the periodicity or rate of recurrence of the applied square wave output of amplifier 7. As previously stated, one pulse is produced at the input of 11 for each half-period of the square wave output of 7. Since the square wave is cyclic and recurring, half-periods thereof may be termed half-cycles. The effective duration of each pulse produced at the input of 11 does not depend in any way upon the periodicity of the square wave applied, provided of course that such periodicity is not too small. Since one pulse is produced, at the input to 11, for each half-cycle of the square wave output of 7 and since each such pulse has a constant length with respect to time, the average energy in such pulses is proportional to the number of pulses per second or to the rate of recurrence of the pulses.

The pulses produced at the input to 11 are of constant duration and recur cyclically at a rate equal to the input tone frequency at 1, 2. It is desired to be pointed out, at this juncture, that the pulses produced by the action of line 8 have a constant duration which is either equal to or less than (but is never greater than) the interval between successive half-periods of the square wave, or the half-period of the sinusoidal tone input.

The pulses are amplified in 11 and applied to a full-wave rectifier 12. The rectified output voltage of rectifier 12 appears across an output resistor 13. Since the average energy in the pulses is proportional to the number of pulses per second, the D. C. output of rectifier 12 varies with the input frequency at 1, 2. The rectified output of rectifier 12 may have the wave shape indicated in Fig. 1.

The D. C. output of 12 varies linearly with the tone frequency input at 1, 2. If the output is proportional to input frequency from zero to say 3,000 cycles per second, then 1,500 cycles will give half the maximum direct voltage output. For the transmitter frequency shift keyer unit commonly used with the converter of Fig. 1, higher R. F. carrier frequency is produced by a negative control voltage. Also, "black" or 2,300 cycles is to be the higher radio frequency, in order to operate the receiver properly. Therefore, we wish to have zero D. C. output for controlling the transmitter at the "white" input frequency of 1,500 cycles. As a result, it is necessary to buck out the direct voltage produced, at 1,500 cycles input, with a constant voltage.

According to this invention, the necessary constant bucking voltage is obtained from the square wave output of clippers 6. A portion of this square wave output is passed through two amplifier stages 14 and 15 in cascade. This square wave output is then rectified in a full-wave rectifier 16. The rectified output voltage of 16 has the wave shape indicated in Fig. 1 and appears across an output resistor 17 the lower end of which is connected to ground. Throughout the input frequency range of 1,500 to 2,300 cycles, amplifier 5 provides sufficient voltage to give a square wave of constant peak-to-peak amplitude at the output of clippers 6. Therefore, no matter what the value of input tone frequency, a constant voltage appears at the output of rectifier 16.

Rectifiers 12 and 16 are so poled relative to each other that the voltage across resistor 17 opposes or bucks that across resistor 13, these two resistors being connected in series to ground or in series across the input of the T-pad 18. The constant bucking voltage provided by rectifier 16 is used to set the resultant output of the converter to zero at the 1,500-cycle or "white" input tone. More particularly, rectifier 16 provides a constant voltage which is positive with respect to ground, while rectifier 12 provides an input-frequency-responsive voltage which is negative with respect to ground. The voltage provided by rectifier 12 is equal to that provided by rectifier 16 at 1,500 cycles input frequency, but is greater than that provided by 16 at other input frequencies above 1,500 cycles. As a result, the output of the converter unit (input of T-pad 18) comprises a zero D. C. signal at 1,500 cycles input and maximum negative D. C. signal at 2,300 cycles input. Moreover, the D. C. output signal varies linearly with input tone frequency between 1,500 and 2,300 cycles.

The constant bucking voltage is obtained from the square waves. Therefore, both the signal voltage and the bucking voltage are obtained from the same source of square waves. If the signal from which the square waves are derived fails entirely the output will be zero (which is desirable), since the square wave source for both the negative signal voltage and the positive constant bucking voltage will then be zero. Also, since the negative signal voltage and the bucking voltage have the same audio frequency components, the same filter 3 may be used to remove the ripple from both voltages. Further, by proper design the power hum components can be reduced by bucking out the hum components in the rectified output.

The resultant voltage across resistors 13 and 17 serves as the input to a T-pad 18, which enables adjustment of the output level. From the output of pad 18, the D. C. output signal is passed through a 1,000-cycle low pass filter 19. This filter removes the unbalanced audio carrier and its components. It passes the varying D. C. components (resulting from varying tone frequency inputs supplied to the converter) which give detail to the picture or other intelligence being transmitted. The input frequency supplied at 1, 2 varies at a rate sufficiently slow for the corresponding variations of D. C. converter output to be passed by filter 19. In other words, the filter 19 has sufficient bandwidth to pass keying speeds for the proper picture detail.

The output of filter 19 is applied to the input of a suitable FSK unit, so that the output of the TSC produces a shift in the R. F. carrier frequency of the radio transmitter. Since the D. C. output of the converter varies in amplitude in proportion to the input tone's frequency, the carrier shift of the transmitter will correspond to such audio or tone input frequency. The circuit constants are such that the zero converter output for the 1,500-cycle "white" input signal and the maximum negative converter output for the 2,300-cycle "black" input signal will produce, with respect to each other, a carrier shift, at the output of the transmitter, of 800 cycles. The "black" frequency of 2,300 cycles gives the higher R. F. The carrier shift is essentially linear with respect to the input tone frequency between the "white" frequency and the "black" frequency.

The instantaneous frequency stability of the transmitter and receiver must be of a high order, to prevent extraneous frequency excursions from modulating the picture. Automatic frequency control (AFC) is used at the receiver to greatly reduce the effects of frequency drift. A typical AFC arrangement for the receiver is disclosed in the copending Atwood application, Serial No. 119,971, filed October 6, 1949. The AFC in the receiver operates with respect to the "black level" and with each revolution of the facsimile machine transmitting drum a pulse of "black" frequency (2,300 cycles) is sent to correct the frequency of the receiver.

The receiver requires a black level for maintaining AFC and the AFC in the receiver has a slow rate of change. It will be recalled that the output of the converter is zero D. C. at the "white" input frequency of 1,500 cycles. Should the line signal to the TSC fail, there would be zero output from the converter. This is because both the signal voltage (frequency-responsive voltage) and the bucking voltage are obtained from the square waves which are derived from the line signal. Should the line signal fail, the transmitter would go to the "white" frequency and the AFC in the receiver would then start running. If the signal then returns the AFC would be off from the black level, possibly for several minutes.

To prevent this occurrence, means are provided to automatically furnish a steady "black" level output from the TSC in the event the input signal falls below a predetermined level. In this way, a "black" signal is provided for holding the AFC of the receiver.

A portion of the output of filter 3 is taken off and applied to a two-stage amplifier 20. The output of this amplifier, which as indicated is substantially sinusoidal when there is a line signal to the TSC, is rectified in a full-wave rectifier 21. Rectifier 21 may be of the bridge type, as illustrated in Fig. 2. The output of this rectifier, which may have the shape illustrated, is applied to the winding of a relay 22. Relay 22 has an armature 23 and a pair of contacts 24 and 25. Armature 23 engages contact 24 when the relay is deenergized and contact 25 when said relay is energized. In Fig. 2 the relay is shown in the deenergized position.

Armature 23 is connected through a suitable resistor to a source of positive plate potential. The plates of the electrode structures constituting push-pull amplifier 4 are connected through resistors to contact 25. Therefore, when relay 22 is energized, armature 23 engages contact 25 to supply plate potential thereto, thus enabling amplifier 4. It is to be understood that normally line signal is present at the output of filter 3. When sufficient line signal is present at the output of 3, it is amplified in 20 and rectified in 21 to energize relay 22, closing contact 25 to enable amplifier 4. When insufficient line signal is present at the output of 3, relay 22 is deenergized to the position illustrated in Fig. 2, breaking contact at 25 to remove plate potential from amplifier 4, disabling such amplifier.

A local audio oscillator 26 is provided in the converter. This oscillator operates at the "black" frequency of 2,300 cycles. The output of this oscillator is applied to a two-stage amplifier 27 the output of which is coupled to the input of one side of the push-pull amplifier 5. Thus, when amplifier 27 is enabled, the 2,300-cycle tone output of oscillator 26 is amplified in 27 and in 5 and applied to clippers 6, giving a steady "black" or maximum negative D. C. output of the TSC.

The plates of the electrode structures constituting amplifier 27 are connected through resistors to contact 24. When relay 22 is deenergized as shown in Fig. 2, plate potential is supplied to contact 24, enabling amplifier 27. If the line signal at the output of 3 drops below a pre-set or predetermined value, relay 22 is deenergized, opening contact 25 and closing contact 24 to disable amplifier 4 and to enable amplifier 27. The local oscillator 26 on "black" frequency is then switched into the circuit to provide a steady D. C. output for "black" at the converter output. This "black" signal will hold the AFC of the receiver at the proper place during failure of the line signal to the TSC.

Upon return of the line signal at the output of 3, relay 27 is energized, closing contact 25 and opening contact 24 to enable amplifier 4 and to disable amplifier 27. The local oscillator 26 is then switched out of the circuit. Normal operation is then resumed, amplifier 4 being enabled to pass line signal at the output of filter 3 on to the remainder of the TSC. Fig. 2 has been occasionally referred to in the above description. In this figure, elements the same as those of Fig. 1 are denoted by the same reference numerals. Therefore, further detailed description of Fig. 2 is believed unnecessary. In connection with Fig. 2, it is to be noted that the two diode clippers 6 are arranged in parallel with each other and are oppositely poled. Equal and opposite biases, having an absolute value of 1.5 volts for example, are applied to these diodes. Diodes 6 may be of the germanium type known as 1N34.

What I claim to be my invention is as follows:

1. In an arrangement for converting a periodic input wave of variable frequency to a direct voltage output the amplitude of which is proportional to the frequency of the input wave, means for clipping said input wave to produce a substantially square wave, means receptive of said square wave for producing a pulse of predetermined constant duration for each half-cycle of said square wave, the average energy in the pulses being proportional to the number of pulses per second and successive pulses being of opposite relative polarity, means for rectifying said pulses in a full-wave manner, means for deriving from said square wave a constant bucking voltage, and means for combining in opposition said bucking voltage and the output of said rectifying means.

2. In an arrangement for converting a periodic input wave of variable frequency to a direct voltage output the amplitude of which is proportional to the frequency of the input wave, means for clipping said input wave to produce a substantially square wave, means receptive of said square wave for producing a pulse of predetermined constant duration for each half-cycle of said square wave, the average energy in the pulses being proportional to the number of pulses per second and successive pulses being of opposite relative polarity, means for rectifying said pulses in a full-wave manner, means for rectifying said square wave in a full-wave manner to produce a constant bucking voltage, and means for combining in opposition said bucking voltage and the output of said first-named rectifying means.

3. In an arrangement for converting a periodic input wave of variable frequency to a direct voltage output the amplitude of which is proportional to the frequency of the input wave, means for clipping said input wave to produce a substantially square wave, a delay line having a short-circuited end, means for applying said square wave to the open end of said line to derive from such wave a pulse of predetermined constant duration for each half-cycle of said square wave, the average energy in the pulses being proportional to the number of pulses per second and successive pulses being of opposite relative polarity, means for rectifying said pulses in a full-wave manner, means for deriving from said square wave a constant bucking voltage, and means for combining in opposition said bucking voltage and the output of said rectifying means.

4. A tone signal converter, comprising connections for supplying a periodic variable-frequency input signal to said converter, means for clipping said input signal to produce a substantially square wave, means receptive of said square wave for producing a pulse of predetermined constant duration for each half-cycle of said square wave, the average energy in the pulses being proportional to the number of pulses per second and successive pulses being of opposite relative polarity, means for rectifying said pulses in a full-wave manner, means for deriving from said square wave a constant bucking voltage, means for combining in opposition said bucking voltage and the output of said rectifying means, and means operative in response to the falling of said input signal below a predetermined level to supply signal of a predetermined frequency to said converter as its input.

5. A tone signal converter, comprising connections for supplying a periodic variable-frequency input signal to said converter, means for clipping said input signal to produce a substantially square wave, means receptive of said square wave for producing a pulse of predetermined constant duration for each half-cycle of said square wave, the average energy in the pulses being proportional to the number of pulses per second and successive pulses being of opposite relative polarity, means for rectifying said pulses in a full-wave manner, means for rectifying said square wave in a full-wave manner to produce a constant bucking voltage, means for combining in opposition said bucking voltage and the output of said first-named rectifying means, a local source of signal of a predetermined frequency, and means operative in response to the falling of said input signal below a predetermined level to couple said source to said converter to supply thereto, as input, signal of said predetermined frequency.

6. A tone signal converter, comprising connections for supplying a substantially sinusoidal variable-frequency input signal to said converter, means for clipping both positive and negative half-cycles of said input signal to produce a substantially square wave, means receptive of said square wave for producing a pulse of predetermined constant length for each half-cycle of said square wave, the average energy in the pulses being proportional to the number of pulses per second and successive pulses being of opposite relative polarity, means for rectifying said pulses in a full-wave manner, a local source of signal of a predetermined frequency, and relay means responsive to the amplitude of said input signal for selectively coupling said source to said converter, said relay means operating to couple said source to said converter to supply thereto, as input, signal of said predetermined frequency, in response to the falling of said input signal below a predetermined level.

7. A tone signal converter, comprising connections for supplying a periodic variable-frequency input signal to said converter, means for clipping said input signal to produce a substantially square wave, a delay line having a short-circuited end, means for applying said square wave to the open end of said line to derive from such wave a pulse of predetermined constant duration for each half-cycle of said square wave, the average energy in the pulses being proportional to the number of pulses per second and successive pulses being of opposite relative polarity, means for rectifying said pulses in a full-wave manner, a local source of signal of a predetermined frequency, and relay means responsive to the amplitude of said input signal for selectively coupling said source to said converter, said relay means operating to couple said source to said converter to supply thereto, as input, signal of said predetermined frequency, in response to the falling of said input signal below a predetermined level.

8. A tone signal converter, comprising connections for supplying a variable-frequency audio input signal to said converter, means for clipping said input signal to produce a substantially square wave, a delay line having a short-circuited end, means for applying said square wave to the open end of said line to derive from such wave a pulse of predetermined constant duration for each half-cycle of said square wave, the average energy in the pulses being proportional to the number of pulses per second and successive pulses being of opposite relative polarity, means for rectifying said pulses in a full-wave manner, means for rectifying said square wave in a full-wave manner to produce a constant bucking voltage, means for combining in opposition said bucking voltage and the output of said first-named rectifying means, an audio oscillator having a predetermined audio frequency, and relay means responsive to the amplitude of said input signal for selectively coupling said oscillator to said converter, said relay means operating to couple said oscillator to said converter to supply thereto, as input, audio signal of said predetermined frequency, in response to the falling of said input signal below a predetermined level.

HALLAN E. GOLDSTINE.

REFERENCES CITED

The following references are of record in the file of this patent:

UNITED STATES PATENTS

| Number | Name | Date |
|---|---|---|
| 2,230,212 | Crosby | Jan. 28, 1941 |
| 2,284,444 | Peterson | May 26, 1942 |
| 2,416,305 | Grieg | Feb. 25, 1947 |
| 2,441,957 | De Rosa | May 25, 1948 |
| 2,498,488 | Fyler | Feb. 21, 1950 |
| 2,546,371 | Peterson | Mar. 27, 1951 |
| 2,576,833 | Goodall | Nov. 27, 1951 |